(12) United States Patent
Hopkins et al.

(10) Patent No.: US 7,279,518 B2
(45) Date of Patent: Oct. 9, 2007

(54) FILLED ELASTOMERIC BUTYL COMPOUNDS

(75) Inventors: William Hopkins, Sarnia (CA); Rui Resendes, Sarnia (CA)

(73) Assignee: Lanxess Inc., Sarnia, Ontario (CA)

( * ) Notice: Subject to any disclaimer, the term of this patent is extended or adjusted under 35 U.S.C. 154(b) by 445 days.

(21) Appl. No.: 10/085,874

(22) Filed: Feb. 28, 2002

(65) Prior Publication Data

US 2002/0156173 A1    Oct. 24, 2002

(30) Foreign Application Priority Data

Mar. 2, 2001    (CA)  .................................... 2339080

(51) Int. Cl.
*C08K 3/04*    (2006.01)
(52) U.S. Cl. ........................ 524/247; 524/492; 524/495
(58) Field of Classification Search ................ 524/247, 524/492, 495
See application file for complete search history.

(56) References Cited

U.S. PATENT DOCUMENTS

| | | | |
|---|---|---|---|
| 4,146,689 A * | 3/1979 | Onizawa ..................... 525/349 |
| 4,286,079 A * | 8/1981 | Onizawa ..................... 524/194 |
| 5,393,816 A * | 2/1995 | Kondo et al. ................ 524/267 |
| 5,428,099 A | 6/1995 | Morrar et al. ............... 524/495 |
| 2001/0009948 A1 | 7/2001 | Hopkins et al. ......... 525/330.7 |

FOREIGN PATENT DOCUMENTS

| | | |
|---|---|---|
| EP | 1 081 187 | 3/2001 |
| EP | 1 195 402 | 4/2002 |
| WO | 01/09225 | 2/2001 |
| WO | 02/45942 | 6/2002 |

OTHER PUBLICATIONS

Rubber Tech. 3rd ed. (month unavailable) 1995, pp. 20-58, "The Compounding And Vulcanization of Rubber" by Howard L. Stephens.

* cited by examiner

*Primary Examiner*—Edward J. Cain
(74) *Attorney, Agent, or Firm*—Jennifer R. Seng

(57) ABSTRACT

The invention provides a process for preparing a filled halobutyl elastomer, which comprises mixing a halobutyl elastomer, particles of filler and an additive containing both amino and alcohol functional groups, and curing the filled elastomer with sulfur or other curative systems. This invention has the advantages of (a) not evolving alcohol either during the manufacture or subsequent use of the article manufactured from the compound, and (b) significantly reducing the cost of the compound.

2 Claims, 4 Drawing Sheets

FILLED ELASTOMERIC BUTYL COMPOUNDS

FIELD OF THE INVENTION

The present invention relates to halogenated butyl elastomers, in particular bromobutyl elastomers. Further, the present invention relates to a process for preparing a filled halobutyl elastomer.

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between carbon black and highly unsaturated elastomers such as polybutadiene (BR) and styrene butadiene copolymers (SBR) occurs because of the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Co-pending U.S. application Ser. No. 09/742,797, published as US-2001-0009948-A1 on Jul. 26, 2001, shows that it is possible to produce filled butyl elastomer compositions with much improved properties by combining halobutyl elastomers with silica and specific silanes. These silanes act as dispersing and bonding agents between the halogenated butyl elastomer and the filler.

SUMMARY OF THE INVENTION

The present invention provides a process for preparing compositions containing halobutyl elastomers in which there is enhanced interaction between the elastomer and a filler, especially a mineral filler or carbon black. The invention also provides filled halobutyl elastomer compositions, which have improved properties when, compared to known carbon black-filled halobutyl elastomeric compositions. In particular it provides a means to produce such filled compositions without the evolution of alcohol, and at significantly reduced cost, compared to processes known in the art.

Surprisingly, it has been discovered that certain organic compounds containing at least one basic nitrogen-containing group and at least one hydroxyl group enhance the interaction of halobutyl elastomers with mineral fillers and carbon black, resulting in improved compound properties such as tensile strength and abrasion (DIN). Of particular interest are compounds containing primary amine and hydroxyl groups such as ethanolamine. These organic compounds are believed to disperse and bond the filler to the halogenated elastomers.

Accordingly, the present invention provides a process which comprises mixing a halobutyl elastomer with a filler, especially a mineral filler or carbon-black, in the presence of an additive which is an organic compound having at least one hydroxyl group and at least one basic nitrogen-containing group, and curing the resulting filled halobutyl elastomer. The resulting composition, having improved properties, forms another aspect of the invention.

The halobutyl elastomer that is admixed with the filler and the silane may be a mixture with another elastomer or elastomeric compound. The halobutyl elastomer should constitute more than 5% of any such mixture. Preferably the halobutyl elastomer should constitute at least 10% of any such mixture. In some cases it is preferred not to use mixtures but to use the halobutyl elastomer as the sole elastomer. If mixtures are used, then the other elastomer may be, for example, natural rubber, polybutadiene, styrene-butadiene or poly-chloroprene or an elastomer compound containing one or more of these elastomers.

The filled halobutyl elastomer can be cured to obtain a product, which has improved properties, for instance in abrasion resistance, rolling resistance and traction. Curing can be effected with sulfur. The preferred amount of sulfur is in the range of from 0.25 to 2.1 parts by weight per hundred parts of rubber. An activator, for example zinc oxide, may also be used, in an amount in the range of from 5 parts to 2 parts by weight. Other ingredients, for instance stearic acid, antioxidants, or accelerators may also be added to the elastomer prior to curing. Sulfur curing is then effected in known manner. See, for instance, chapter 2, "The Compounding and Vulcanization of Rubber", of "Rubber Technology", $3^{rd}$ edition, published by Chapman & Hall, 1995, the disclosure of which is incorporated by reference.

Other curatives known to cure halobutyl elastomers may also be used. A number of compounds are known to cure BIIR, for example, such as bis dieneophiles (for example HVA2) phenolic resins, amines, amino-acids, peroxides, zinc oxide and the like. Combinations of the aforementioned curatives may also be used.

The filled halobutyl elastomer of the present invention can be admixed with other elastomers or elastomeric compounds before it is subjected to the curing with sulfur or other known curatives. This is discussed in more detail below.

DETAILED DESCRIPTION OF THE DRAWINGS

DETAILED DESCRIPTION OF THE INVENTION

Figure 1:
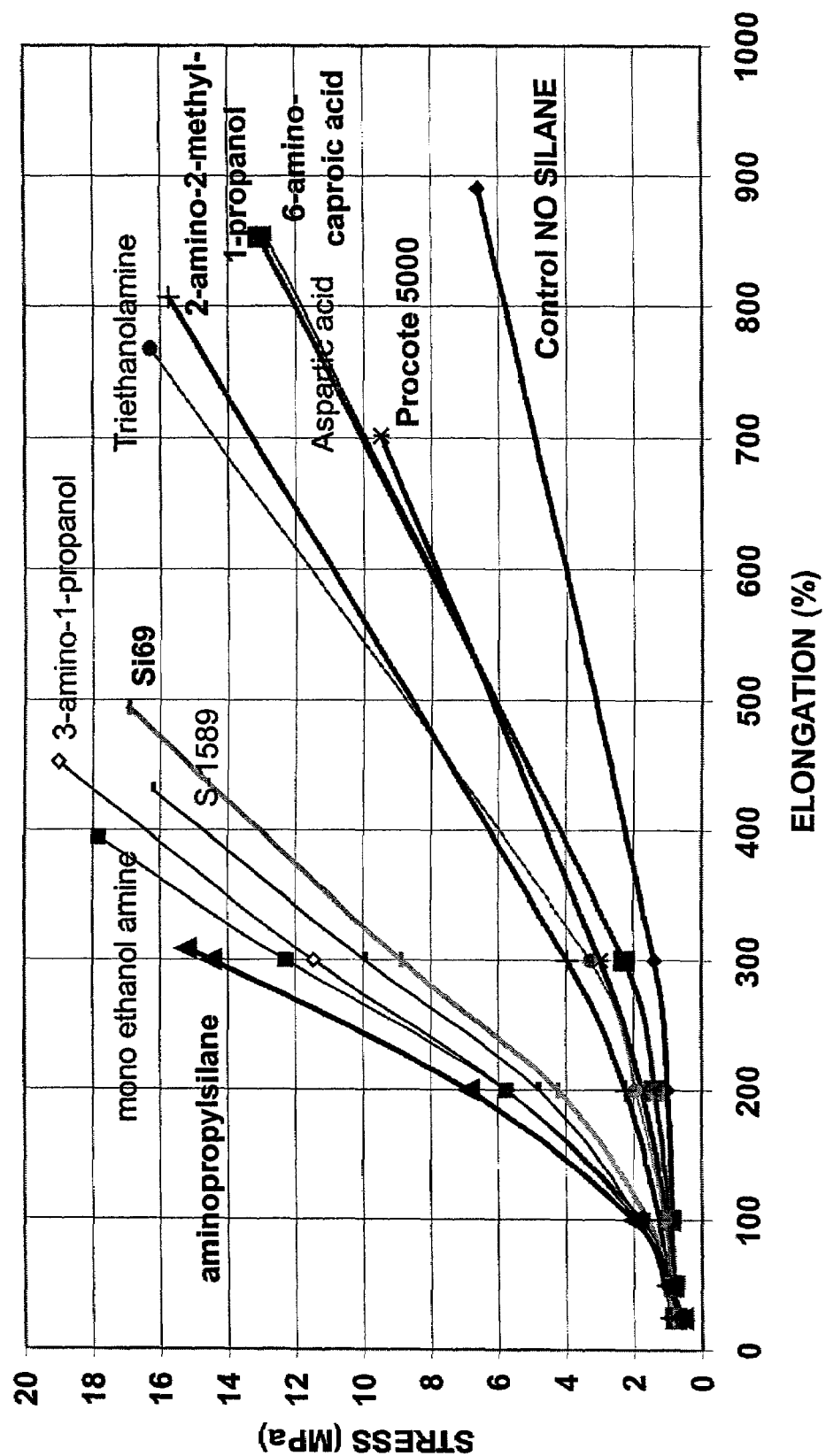
FIG. 1 illustrates a plot of the stress strain data for compositions containing BIIR, silica and an additive.

The phrase "halobutyl elastomer(s)" as used herein refers to a chlorinated or brominated butyl elastomer. Brominated butyl elastomers are preferred, and the invention is illustrated, by way of example, with reference to such bromobutyl elastomers. It should be understood, however, that the invention extends to the use of chlorinated butyl elastomers.

Halobutyl elastomers suitable for use in the present invention include, but are not limited to, brominated butyl elastomers. Such elastomers may be obtained by bromination of butyl rubber (which is a copolymer of isobutylene and a co-monomer that is usually a $C_4$ to $C_6$ conjugated diolefin, preferably isoprene). Co-monomers other than conjugated diolefins can be used, however, and mention is made of alkyl-substituted vinyl aromatic co-monomers such as $C_1$-$C_4$-alkyl substituted styrene. An example of such an elastomer which is commercially available is brominated isobutylene methylstyrene copolymer (BIMS) in which the co-monomer is p-methylstyrene.

Brominated butyl elastomer typically contains in the range of from 0.1 to 5 weight percent of isoprene and in the range of from 95 to 99.9 weight percent of isobutylene (based upon the hydrocarbon content of the polymer) and in the range of from 0.1 to 5 weight percent bromine (based upon the bromobutyl polymer). A typical bromobutyl polymer has a molecular weight, expressed as the Mooney viscosity (ML 1+8 at 125° C.), of from 28 to 55. Such brominated butyl elastomer can be prepared by means known in the art or are available commercially, e.g. as Bayer Bromobutyl® 2030 from Bayer Inc., Canada, which is an isobutene-isoprene copolymer with a ML 32±4 and a bromine content of 2 wt. %.

For use in the present invention the brominated butyl elastomer preferably contains in the range of from 1 to 2 weight percent of isoprene and in the range of from 98 to 99 weight percent of isobutylene (based upon the hydrocarbon content of the polymer) and in the range of from 0.5 to 2.5 weight percent, preferably in the range of from 0.75 to 2.3 weight percent, of bromine (based upon the brominated butyl polymer).

A stabilizer may be added to the brominated butyl elastomer. Suitable stabilizers include calcium stearate and epoxidized soybean oil, preferably used in an amount in the range of from 0.4 to 5 parts by weight per 100 parts by weight of the brominated butyl rubber.

Examples of suitable brominated butyl elastomers include Bayer Bromobutyl® 2030, Bayer Bromobutyl® 2040 (BB2040), and Bayer Bromobutyl® X2 commercially available from Bayer. Bayer BB2040 has a Mooney viscosity (RPML 1+8@125° C.) of 39±4, a bromine content of 2.0±0.3 wt % and an approximate molecular weight of 500,000 grams per mole.

The brominated butyl elastomer used in the process of this invention may also be a graft copolymer of a brominated butyl rubber and a polymer based upon a conjugated diolefin monomer. PCT Application NO. PCT/CA00/00866, published as WO 01/09225 A1 on Feb. 8, 2001, is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The disclosure of this application is incorporated herein by reference. The bromobutyl elastomer of the graft copolymer can be any of those described above. The conjugated diolefins that can be incorporated in the graft copolymer generally have the structural formula

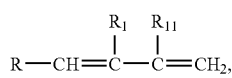

wherein R is a hydrogen atom or an alkyl group containing in the range of from 1 to 8 carbon atoms and wherein $R_1$ and $R_{11}$ can be the same or different and are selected from the group consisting of hydrogen atoms and alkyl groups containing in the range of from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing in the range of from 4 to 8 carbon atoms are preferred, 1,3-butadiene and isoprene being especially preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, are selected so as to be copolymerizable with the conjugated diolefin monomers being employed. Generally, any vinyl aromatic monomer, which is known to polymerize with organo-alkali metal initiators, can be used. Such vinyl aromatic monomers usually contain in the range of from 8 to 20 carbon atoms, preferably in the range of from 8 to 14 carbon atoms. Suitable vinyl aromatic monomers which can be so copolymerized include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

The filler is composed of particles of carbon-black or a mineral, and examples include silica, silicates, clay (such as bentonite), gypsum, alumina, titanium dioxide, talc and the like, as well as mixtures thereof. The mineral particles have hydroxyl groups on their surface (in significantly higher concentrations than that found for carbon-black), rendering them hydrophilic and oleophobic. This exacerbates the difficulty of achieving good interaction between the mineral filler particles and the butyl elastomer. Furthermore, the low levels of unsaturation found in butyl elastomers exacerbates the difficulty in achieving good interaction between this class of elastomers and carbon-black. For many purposes, the preferred mineral is silica, especially silica prepared by the carbon dioxide precipitation of sodium silicate.

Dried amorphous silica particles suitable for use in accordance with the invention have a mean agglomerate particle size between 1 and 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are available under the trademarks HiSil 210, HiSil 233 and HiSil 243 from PPG Industries Inc. Also suitable are Vulkasil S and Vulkasil N, from Bayer AG.

Examples of carbon-blacks include carbon-blacks prepared by the lamp black, furnace black or gas black process and have BET specific surface areas of 20 to 200 m$^2$/g, e.g. SAF, ISAF, HAF, SRF, FEF or GPF carbon-blacks.

The additive contains at least one hydroxyl group and at least one group containing a basic nitrogen atom. These groups possess the ability to (without being bound to any particular theory) react with the filler or with the active halogen in a halogenated butyl elastomer (for example with the active bromine atom in a brominated butyl elastomer). Functional groups containing —OH may be, for example, alcohols or carboxylic acids. Functional groups containing a basic nitrogen atom include, but are not limited to, amines (which can be primary, secondary or tertiary) and amides.

Preferred are primary alkyl amine groups such as aminoethyl, aminopropyl and the like.

Examples of additives that give enhanced physical properties to mixtures of halobutyl elastomers and filler include proteins, aspartic acid, 6-aminocaproic acid, diethanolamine and triethanolamine. Preferably, the additive should contain a primary alcohol group and a primary amino group separated by methylene bridges, which may be branched. Such compounds have the general formula $HO—A—NH_2$; wherein A represents a $C_1$ to $C_{20}$ alkylene group, which may be linear or branched.

More preferably, the number of methylene groups between the two functional groups should be in the range of from 1 and 4. Examples of preferred additives include mono-ethanolamine and 3-amino-1-propanol.

The amount of filler to be incorporated into the halobutyl elastomer can vary between wide limits. Typical amounts of filler are in the range of from 20 parts to 120 parts by weight, preferably in the range of from 30 parts to 100 parts, more preferably from 40 to 80 parts per hundred parts of elastomer. The amount of the additive used is dependent upon the molecular/equivalent weight of each specific compound. One important factor is the number/weight of nitrogen per unit weight of the compound. The level of nitrogen may range from 0.1 to 5 parts per hundred (phr) of halobutyl rubber, preferably from 0.125 to 1 phr and, more preferably, from 0.3 to 0.7 phr. Up to 40 parts of processing oil, preferably in the range of from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

Carbon black may be present in an amount up to 40 phr. If the mineral filler is silica and it is used as a mixture with carbon black, the silica should constitute at least 55% by weight of the total of silica and carbon black. If the halobutyl elastomer composition of the invention is blended with another elastomeric composition, that other composition may contain more carbon black as a filler.

The halobutyl elastomer, filler and additive are mixed together, suitably at a temperature in the range of from 25 to 200° C. It is preferred that the temperature in one of the mixing stages be greater than 60° C., and a temperature in the range of from 90 to 150° C. is particularly preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The enhanced interaction between the filler and the halobutyl elastomer results in improved properties for the filled elastomer. These improved properties include higher tensile strength, higher abrasion resistance, lower permeability and better dynamic properties. These render the filled elastomers particularly suitable for a number of applications, including, but not limited to, use in tire treads and tire sidewalls, tire innerliners, tank linings, hoses, rollers, conveyor belts, curing bladders, gas masks, pharmaceutical enclosures and gaskets.

In a preferred embodiment of the invention, bromobutyl elastomer, silica particles, additive and, optionally, processing oil extender are mixed on a two-roll mill at a nominal mill temperature of 25° C. The mixed compound is then placed on a two-roll mill and mixed at a temperature 60° C. It is preferred that the temperature of the mixing is not too high, and more preferably does not exceed 150° C., since higher temperatures may cause curing to proceed undesirably far and thus impede subsequent processing. The product of mixing these four ingredients at a temperature not exceeding 150° C. is a compound which has good stress/strain properties and which can be readily processed further on a warm mill with the addition of curatives.

The filled halobutyl rubber compositions of the invention, and in particular filled bromobutyl rubber compositions, find many uses, but mention is made particularly of use in tire tread compositions. Important features of a tire tread composition are that it shall have low rolling resistance, good traction, particularly in the wet, and good abrasion resistance so that it is resistant to wear. Compositions of the invention display these desirable properties. Thus, an indicator of traction is tan δ at 0° C., with a high tan δ at 0° C. correlating with good traction. An indicator of rolling resistance is tan δ at 60° C., with a low tan δ at 60° C. correlating with low rolling resistance. Rolling resistance is a measure of the resistance to forward movement of the tire, and low rolling resistance is desired to reduce fuel consumption. Low values of loss modulus at 60° C. are also indicators of low rolling resistance. As is demonstrated in the examples below, compositions of the invention display high tan δ at 0° C., low tan δ at 60° C. and low loss modulus at 60° C.

The filled halobutyl elastomers of this invention can be further mixed with other rubbers, for example natural rubber, butadiene rubber, styrene-butadiene rubber and isoprene rubbers, and compounds contain these elastomers.

The invention is further illustrated in the following examples and the accompanying Figures.

EXAMPLES

Description of Tests:
   Abrasion resistance: DIN 53-516 (60 grit Emery paper)
   Dynamic Property Testing
   Dynamic testing (Tan δ at 0° C. and 60° C., Loss modulus at 60° C.) were carried out using the Rheometrics RSA II. The RSA II is a dynamic mechanical analyzer for characterizing the properties of vulcanized elastomeric materials. The dynamic mechanical properties give a measure of traction with the best traction usually obtained with high values of Tan δ at 0° C. Low values of Tan δ at 60° C., and in particular, low loss modulus at 60° C. are indicators of low rolling resistance.
   Cure rheometry: ASTM D 52-89 MDR2000E Rheometer at 3° arc and 1.7 Hz
   Permeability: ASTM D 14-34
   The invention is further illustrated in the following examples.

Description of Ingredients and General Mixing Procedure:
   Hi-Sil 233—silica—a product of PPG
   Sunpar 2280—paraffinic oil produced by Sun Oil.
   Pro-Cote® 5000 is a low molecular weight, chemically modified soy polymer designed as a multi-functional coating additive and binderproduced by Protein Technologies International, located in St Louis, Mo., USA.
   The brominated butyl elastomer (Bayer Bromobutyl® 2030), silica, oil and a bonding compound were mixed on a 6"×12" two-roll mill with the rolls running at 24 and 32 rpm. The mill roll was set at 25° C., with a total incorporation time of 10 minutes. The mixed compounds were then "heat treated" for a further 10 minutes with the roll temperature at 110° C. The final rubber temperature was 125° C. Curatives were then added to the cooled sample with the mill at 25° C.

Example 1

A number of different additives containing hydroxyl and nitrogen atoms were compared with 3 different silane additives commonly used in elastomer silica compounds. A compound containing no bonding agent was also prepared, as a control sample.

The bonding agents used were:
(i) 6-Amino caproic acid;
(ii) Aspartic acid;
(iii) Pro-Cote® 5000 (soy protein);
(iv) Triethanolamine;
(v) 2-Amino-2-methyl-1-propanol;
(vi) 3-Amino-1-propanol; and
(vii) Monoethanolamine.

The three commonly used silanes used for comparison purposes were:
(a) Amino propyl triethoxy silane;
(b) Si69, bis[3-(triethoxysilyl)propyl]- tetrasulfane $[(C_2H_5O)_3Si—(CH_2)_3—S_4—(CH_2)_3—Si(OC_2H_5)_3]$; and
(c) Silquest 1589, bis[3-(triethoxysilyl)propyl]- disulfane $(C_2H_5O)_3Si—(CH_2)_3—S_2—(CH_2)_3—Si(OC_2H_5)_3]$.

Brominated isoprene isobutylene rubber (BIIR) was mixed with the additive, 60 parts per hundred rubber (phr) of silica filler (Hisil 233) and 10 phr of oil extender (Sunpar 2280) on a 6"×12" mill under the mixing conditions described above. Identical curative ingredients (1 phr of stearic acid and sulfur, and 1.5 phr. of ZnO) were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 1 shows the product compositions, and physical property data for three commonly used silanes and for a compound containing no filler bonding agent.

The data in Table 1 shows the effect of adding silanes to assist in the dispersion and bonding of the filler in the brominated butyl elastomer. The ratio M300/M100 is commonly used as a relative measure of the degree of filler reinforcement in an elastomer compound (the higher the ratio the higher the reinforcement). M300/M100 for the control (no silane) is 1.6 and for silanes ranges from 5.4 to 7.3.

Table 2 shows the product compositions and physical property data for representative additives used in the present invention.

The data in Table 2 shows that the products of the present invention have M300/M100 values of between 2.4 and 7.0. In comparison with the data in Table 1, this shows that all the additives in Table 2 provide some degree of reinforcement. FIG. 1, a plot of the stress strain data, also shows this reinforcement.

Examination of the DIN Abrasion test data shows that the additives improve wear, although the sample containing no bonding agent was too soft too test. Preferred additives, exemplified by 3-amino-1-propanol and mono-ethanolamine, show much higher values for Tan δ at 60° C. and much lower values for the loss modulus at 60° C. than the other additives.

Example 2

Comparisons were made for mono-, di-, and tri- ethanolamine in a compound containing BIIR +Hi-Sil 233.

Brominated isoprene isobutylene rubber (BIIR) was mixed with the various additives and 60 phr of silica filler (Hisil 233) on a 6"×12" mill under the mixing conditions described above. Identical curative ingredients, 1 phr of stearic acid and sulfur, and 1.5 phr. of ZnO, were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 3 shows the product compositions, and physical property data in comparison with amino-propyl triethoxy silane.

The M300/M100 data in Table 3 shows that the primary amine is better than the secondary amine which is better than the tertiary amine in dispersing and bonding the filler to the BIIR. The mono-ethanolamine also has the highest Tan δ at 60° C. and the lowest values for the loss modulus at 60° C.

Example 3

To investigate the effect of the concentration of the dispersing and bonding agent, the concentration of 3-amino-1-propanol was varied from 1.4 to 2.8 to 5.4 phr.

Brominated isoprene isobutylene rubber (BIIR) was mixed with 3-amino-1-propanol and 60 phr of silica filler (Hisil 233) on a 6"×12" mill under the mixing conditions described above. Identical curative ingredients, 1 phr. of stearic acid and sulfur, and 1.5 phr. of ZnO, were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 4 shows the product compositions, and physical property data in comparison with amino-propyl triethoxy silane. The data in Table 4 shows that a level of 2.8 phr. is preferred to that of either 1.4 or 5.4 phr. of 3-amino-1-propanol.

Example 4

To investigate the effect of the number of methylene (—CH$_2$—) groups between the amine and the alcohol functional groups, monoethanolamine, 3-amino-1-propanol, and 5-amino-1-pentanol were compared with the same equivalent number of amino groups. The data is shown in Table 5.

The data in Table 5 shows poorer properties for 5-amino-1-pentanol compared to monoethanolamine and 3-amino-1-propanol.

Example 5

Figure 2:
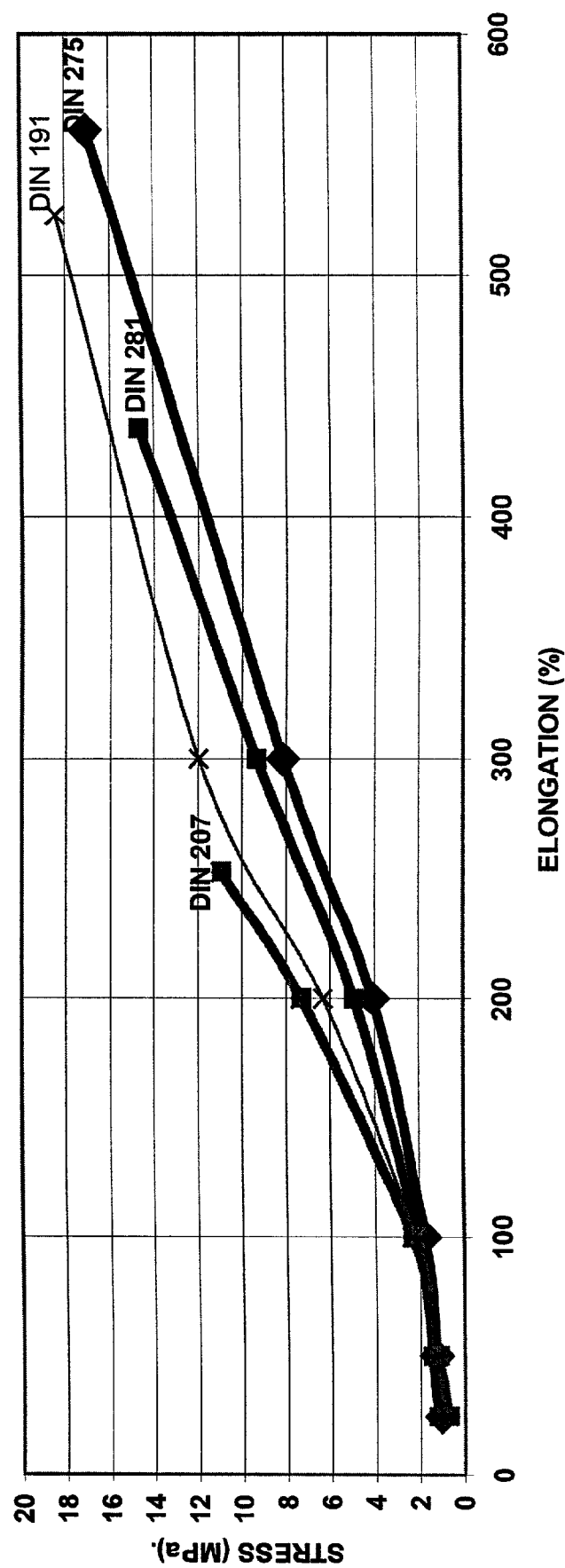
FIG. 2 illustrates a plot of the stress strain data for mono, di, and tri-ethanolamine in a compound containing BIIR and silica.

To show the effect on compounds with carbon-black as a filler brominated isoprene isobutylene rubber (BIIR) was mixed with 8 phr of various amino-alcohols and amino-acids and 50 phr carbon-black (N234 from Degussa) on a 6"×12" mill under the mixing conditions described above. As curative ingredients 1 phr. of stearic acid, 0.5 phr of sulfur, 1.3 phr of dibenzothiazyl disulphide (Vulkacit® DM) and 1.5 phr of ZnO were then added on a cool mill to each of the compounds. The compounds were then cured for $t_{c(90)}$+5 minutes at 170° C. and tested to ascertain the effect of the amino-alcohols/amino acids on the stress at a given strain level (see FIG. 2: DIN 275=control, DIN 281=6-Amino-caproic acid, DIN 191=2-Amino-1-propanol, DIN 207=3-Amino-1-propanol).

Example 6

Figure 3:
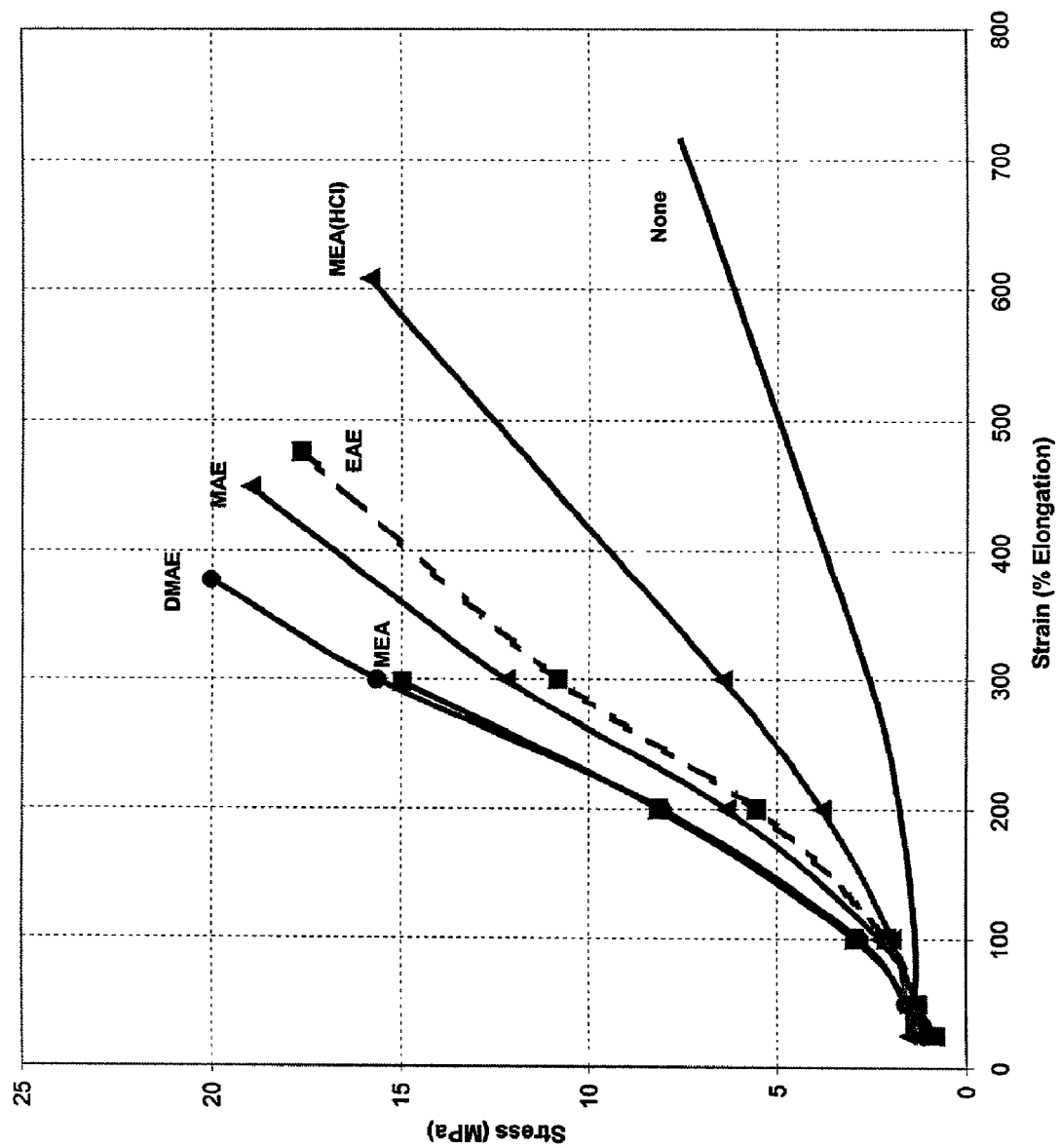
FIG. 3 illustrates the effect of the amino-alcohols on the stress at a given strain level.
Figure 4:
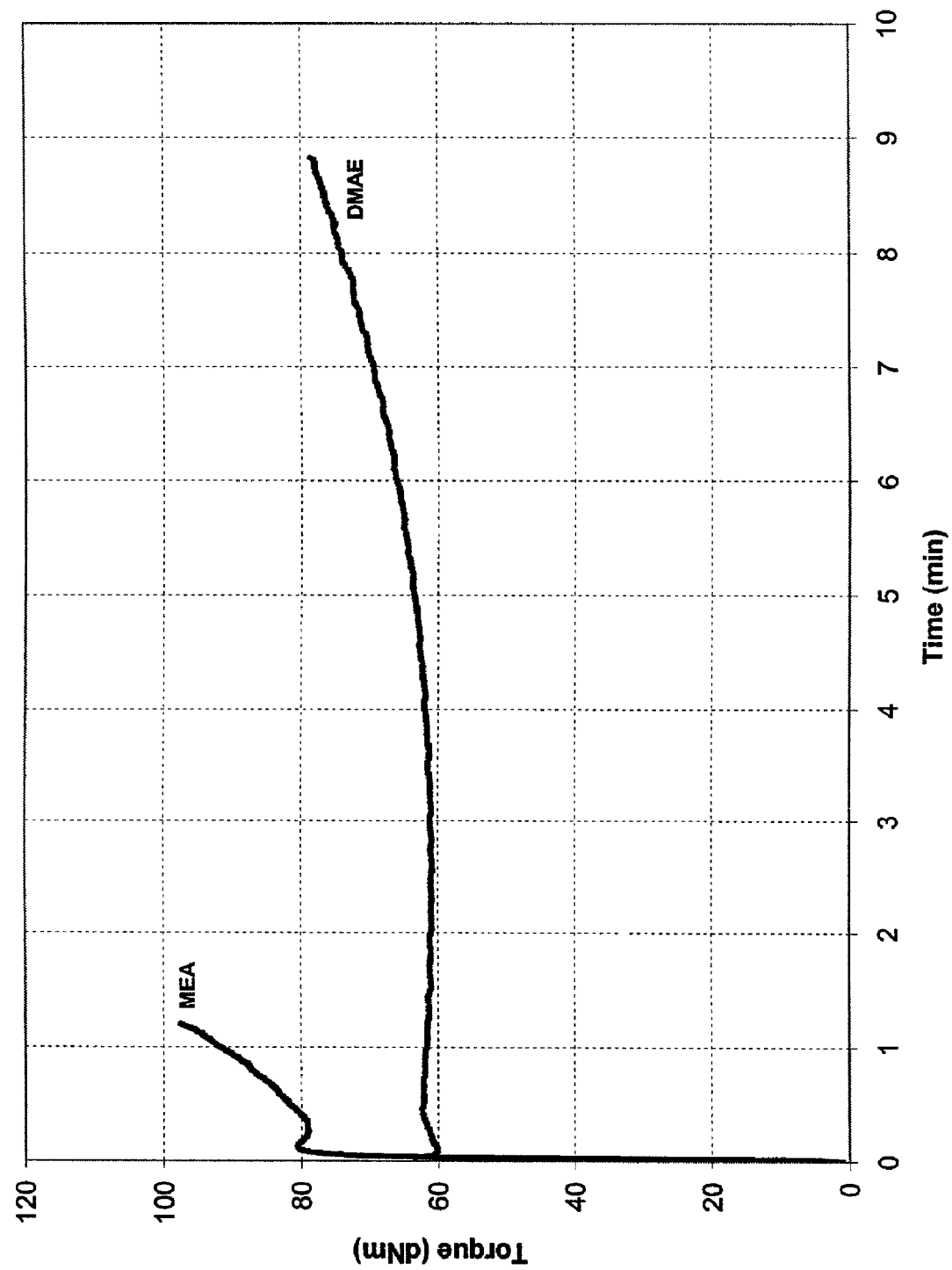
FIG. 4 illustrates the advantages in scorch safety between N,N-dimethylethanolamine and ethanolamine.

To show the effect of substituents on the amino-alcohols in compounds with silica as a filler brominated isoprene isobutylene rubber (BIIR) was mixed with 8 phr of various amino-alcohols and 60 phr of silica filler (Hisil 233) on a 6"×12" mill under the mixing conditions described above. Identical curative ingredients, 1 phr. of stearic acid and sulfur, and 1.5 phr. of ZnO, were then added on a cool mill to each of the compounds. The compounds were then cured for $t_{c(90)}$+5 minutes at 170° C. and tested to ascertain the effect of the amino-alcohols on the stress at a given strain level (see FIG. 3: DMAE=N,N-dimethylethanolamine, MEA=ethanolamine, MEA(HCl)=ethanolamine-HCl adduct, EAE=ethylaminoethanol, MAE=methylaminoethanol.). Furthermore, it was found that DMAE has significant advantages in scorch safety over MEA (see FIG. 4)

TABLE 1

| Additive | (control) | (C) | (b) | (a) |
|---|---|---|---|---|
| Additive amount (phr.). | 0 | 8.6 | 9.8 | 8 |
| STRESS STRAIN (Die C DUMBELLS, cure tc90 + 5 @ 170° C., tested @ 23° C.) | | | | |
| Hard. Shore A2 Inst. (pts.) | 61 | 62 | 59 | 51 |
| Ultimate Tensile (MPa) | 6.6 | 16.2 | 16.9 | 15.2 |
| Ultimate Elongation (%) | 890 | 431 | 494 | 309 |
| Stress @ 50 (MPa) | 0.89 | 1.13 | 1.03 | 0.95 |
| Stress @ 100 (MPa) | 0.87 | 1.83 | 1.59 | 2 |
| Stress @ 200 (MPa) | 1.01 | 4.8 | 4.23 | 6.89 |
| Stress @ 300 (MPa) | 1.39 | 9.94 | 8.88 | 14.5 |
| M300/M100 | 1.6 | 5.43 | 5.58 | 7.3 |
| DIE C TEAR (cured tc90 + 5 @ 170° C., tested @ R.T.) | | | | |
| Tear Strength (kN/m) | 18.7 | 25.8 | 30.3 | 18.8 |
| DIN ABRASION (cure tc90 + 5 @ 170° C.,) | | | | |
| Abrasion Volume Loss (mm³) | NR sample deformed | 235 | 198 | 230 |
| RSA II, TEMPERATURE SWEEP (2° C./min, 60 sec soak, 70 rad/s, cured tc90 + 5 @ 170° C.) | | | | |
| Tan delta @ 0° C. | 0.32 | 0.65 | 0.66 | 0.77 |
| Tan delta @ +60° C. | 0.10 | 0.16 | 0.16 | 0.11 |
| Loss modulus @ +60° C. | 1.90 | 0.79 | 0.63 | 0.45 |
| MDR CURE CHARACTERISTICS (1.7 Hz, 170 deg. C., 3 arc, 60 mins.) | | | | |
| MH (dN.m) | 22.8 | 34.5 | 32.8 | 38.4 |
| ML (dN.m) | 14.7 | 6.7 | 7.3 | 11.8 |
| ts 1 (min) | 1.02 | 0.72 | 0.54 | 0.66 |
| ts 2 (min) | 1.98 | 0.9 | 0.66 | 0.84 |
| t' 10 (min) | 0.86 | 1.11 | 0.74 | 0.94 |
| t' 50 (min) | 5.61 | 5.84 | 2.34 | 3.36 |
| t' 90 (min) | 23.9 | 22.3 | 10.8 | 9.1 |
| t' 95 (min) | 28.6 | 26.2 | 13.1 | 11.0 |

TABLE 2

| Additive | (i) | (ii) | (iii) | (iv) | (v) | (vi) | (vii) |
|---|---|---|---|---|---|---|---|
| Additive amount (phr.). | 4.8 | 4.8 | 8 | 5.4 | 3.25 | 2.7 | 2.2 |
| STRESS STRAIN (Die C DUMBELLS, cure tc90 + 5 @ 170° C., tested @ 23° C.,) | | | | | | | |
| Hard. Shore A2 Inst. (pts.) | 61 | 60 | 58 | 62 | 64 | 54 | 50 |
| Ultimate Tensile (MPa) | 13.1 | 12.9 | 9.5 | 16.3 | 15.8 | 19.0 | 17.8 |
| Ultimate Elongation (%) | 853 | 856 | 702 | 768 | 807 | 453 | 395 |
| Stress @ 50 (MPa) | 0.82 | 0.82 | 0.88 | 0.86 | 1.02 | 1.03 | 0.91 |
| Stress @ 100 (MPa) | 0.94 | 0.94 | 1.04 | 1.09 | 1.27 | 1.9 | 1.76 |
| Stress @ 200 (MPa) | 1.4 | 1.39 | 1.75 | 1.95 | 2.23 | 5.74 | 5.77 |
| Stress @ 300 (MPa) | 2.28 | 2.32 | 2.99 | 3.27 | 3.96 | 11.48 | 12.27 |
| M300/M100 | 2.4 | 2.47 | 2.9 | 3.00 | 3.1 | 6.0 | 6.97 |
| DIE C TEAR (cured tc90 + 5 @ 170° C., tested @ R.T.) | | | | | | | |
| Tear Strength (kN/m) | 48.3 | 56.0 | 27.0 | 51.9 | 55.2 | 29.5 | 25.0 |
| DIN ABRASION (cure tc90 + 5 @ 170° C.,) | | | | | | | |
| Abrasion Volume Loss (mm³) | 615 | 210 | 651 | 543 | 422 | 262 | 423 |
| RSA II, TEMPERATURE SWEEP (2° C./min, 60 sec soak, 70 rad/s, cured tc90 + 5 @ 170° C.) | | | | | | | |
| Tan delta @ 0° C. | 0.33 | 0.31 | 0.45 | 0.36 | 0.33 | 0.55 | 0.59 |
| Tan delta @ +60° C. | 0.13 | 0.13 | 0.14 | 0.11 | 0.11 | 0.10 | 0.11 |
| Loss modulus @ +60° C. | 2.23 | 2.36 | 1.42 | 2.27 | 1.60 | 0.86 | 0.77 |
| MDR CURE CHARACTERISTICS (1.7 Hz, 170 deg. C., 3 arc, 60 mins.) | | | | | | | |
| MH (dN.m) | 29.6 | 30.3 | 25.2 | 38.5 | 34.9 | 42.6 | 37.2 |
| ML (dN.m) | 12.1 | 11.8 | 12.4 | 9.3 | 9.0 | 10.4 | 9.0 |
| ts1 (min) | 0.72 | 0.66 | 0.96 | 0.6 | 0.9 | 0.48 | 0.66 |
| ts 2 (min) | 0.96 | 0.9 | 1.38 | 0.72 | 1.2 | 0.6 | 0.84 |
| t' 10 (min) | 0.85 | 0.84 | 1.05 | 0.82 | 1.37 | 0.71 | 0.95 |
| t' 50 (min) | 3.08 | 3.13 | 5.47 | 2.55 | 5.38 | 3.08 | 4.26 |
| t' 90 (min) | 9.6 | 9.6 | 26.4 | 8.5 | 14.6 | 9.5 | 12.3 |
| t' 95 (min) | 12.0 | 12.3 | 32.8 | 11.3 | 17.5 | 12.0 | 14.9 |

TABLE 3

| Additive | (a) | (vii) | diethanolamine | (iv) |
|---|---|---|---|---|
| Additive amount (phr.) | 8 | 2.2 | 3.9 | 5.4 |
| STRESS STRAIN (Die C DUMBELLS, t90 + 5 @ 170° C., tested @ 23° C.) | | | | |
| Hard. Shore A2 Inst. (pts.) | 57 | 58 | 67 | 70 |
| Ultimate Tensile (MPa) | 16.5 | 18.5 | 20.1 | 17.6 |
| Ultimate Elongation (%) | 278 | 329 | 545 | 658 |
| Stress @ 50 (MPa) | 1.17 | 1.3 | 1.37 | 1.17 |
| Stress @ 100 (MPa) | 2.43 | 2.69 | 2.08 | 1.46 |
| Stress @ 200 (MPa) | 8.75 | 8.5 | 5.21 | 2.94 |
| Stress @ 300 (MPa) | 17.92 | 16.81 | 10.1 | 6 |
| 300M/100M | 7.4 | 6.2 | 4.9 | 4.1 |
| DIE C TEAR (cured tc90 + 5 @ 170° C., tested @ R.T.) | | | | |
| Tear Strength (kN/m) | 19.0 | 27.8 | 42.1 | 47.3 |
| DIN ABRASION (cure tc90 + 10 @ 170° C.,) | | | | |
| Abrasion Volume Loss (mm$^3$) | 113 | 90 | 138 | 145 |
| RSA II, TEMPERATURE SWEEP (2° C./min, 60 sec soak, 70 rad/s, cured tc90 + 5 @ 170° C.) | | | | |
| Tan delta @ 0° C. | 0.806 | 0.639 | 0.436 | 0.374 |
| Tan delta @ +60° C. | 0.109 | 0.105 | 0.096 | 0.085 |
| Loss modulus @ +60° C. | 0.397 | 1.040 | 1.928 | 2.309 |
| MDR CURE CHARACTERISTICS (1.7 Hz., 3° arc, 60' @ 170° C.). | | | | |
| MH (dN.m) | 46.9 | 45.3 | 46.6 | 48.0 |
| ML (dN.m) | 16.3 | 12.3 | 10.8 | 12.8 |
| ts 1 (min) | 0.6 | 0.48 | 0.66 | 0.96 |
| ts 2 (min) | 0.78 | 0.54 | 0.9 | 1.26 |
| t' 10 (min) | 0.88 | 0.65 | 1.16 | 1.64 |
| t' 50 (min) | 2.81 | 2.59 | 4.8 | 5.44 |
| t' 90 (min) | 7.5 | 7.63 | 13.09 | 12.63 |
| t' 95 (min) | 9.16 | 9.48 | 15.94 | 14.9 |

TABLE 4

| 3-amino-1-propanol (phr.) | 1.4 | 2.8 | 5.4 |
|---|---|---|---|
| STRESS STRAIN (Die C DUMBELLS, t90 + 5 @ 170° C., tested @ 23° C.) | | | |
| Hard. Shore A2 Inst. (pts.) | 60 | 58 | 79 |
| Ultimate Tensile (MPa) | 18.1 | 18.0 | 10.0 |
| Ultimate Elongation (%) | 402 | 319 | 202 |
| Stress @ 50 (MPa) | 1.37 | 1.24 | 2.42 |
| Stress @ 100 (MPa) | 2.3 | 2.49 | 4.31 |
| Stress @ 200 (MPa) | 6.2 | 8.14 | 9.83 |
| Stress @ 300 (MPa) | 12.61 | 16.5 | |
| 300M/100M | 5.5 | 6.6 | |
| DIE C TEAR (cured tc90 + 5 @ 170° C., tested @ R.T.) | | | |
| Tear Strength (kN/m) | 32.6 | 25.6 | 30.2 |
| 200M/50M | 4.5 | 6.6 | 4.1 |
| DIN ABRASION (cure tc90 + 10 @ 170° C.,) | | | |
| Abrasion Volume Loss (mm$^3$) | 135 | 109 | 298 |
| RSA II, TEMPERATURE SWEEP (2° C./min, 60 sec soak, 70 rad/s, cured tc90 + 5 @ 170° C.) | | | |
| Tan delta @ 0° C. | 0.591 | 0.644 | 0.407 |
| Tan delta @ +60° C. | 0.106 | 0.108 | 0.080 |
| Loss modulus @ +60° C. | 1.176 | 0.888 | 1.303 |
| MDR CURE CHARACTERISTICS (1.7Hz., 3° arc, 60' @ 170° C.). | | | |
| MH (dN.m) | 41.0 | 45.6 | 61.5 |
| ML (dN.m) | 10.1 | 13.3 | 26.2 |
| ts 1 (min) | 0.72 | 0.48 | 0.42 |
| ts 2 (min) | 0.84 | 0.6 | 0.48 |
| t' 10 (min) | 1.01 | 0.69 | 0.58 |
| t' 50 (min) | 4.12 | 2.4 | 1.8 |
| t' 90 (min) | 11.4 | 6.66 | 5.44 |
| t' 95 (min) | 13.91 | 8.28 | 6.7 |

TABLE 5

| Additive | (vii) | (vi) | 5-amino-1-pentanol |
|---|---|---|---|
| Additive amount (phr.) | 2.2 | 2.8 | 3.8 |
| STRESS STRAIN (Die C DUMBELLS, t90 + 5 @ 170° C., tested @ 23° C.) | | | |
| Hard. Shore A2 Inst. (pts.) | 58 | 58 | 75 |
| Ultimate Tensile (MPa) | 18.5 | 18.0 | 14.6 |
| Ultimate Elongation (%) | 329 | 319 | 227 |
| Stress @ 50 (MPa) | 1.3 | 1.24 | 2.03 |
| Stress @ 100 (MPa) | 2.69 | 2.49 | 4.16 |
| Stress @ 200 (MPa) | 8.5 | 8.14 | 12.05 |
| Stress @ 300 (MPa) | 16.81 | 16.5 | |
| 300M/100M | 6.2 | 6.6 | |
| 200M/50M | 6.5 | 6.6 | 5.9 |
| DIE C TEAR (cured tc90 + 5 @ 170° C., tested @ R.T.) | | | |
| Tear Strength (kN/m) | 27.8 | 25.6 | 24.9 |
| DIN ABRASION (cure tc90 + 10 @ 170° C.,) | | | |
| Abrasion Volume Loss (mm$^3$) | 90 | 109 | 173 |
| RSA II, TEMPERATURE SWEEP (2° C./min, 60 sec soak, 70 rad/s, cured tc90 + 5 @ 170° C.) | | | |
| Tan delta @ 0° C. | 0.64 | 0.64 | 0.49 |
| Tan delta @ +60° C. | 0.10 | 0.11 | 0.09 |
| Loss modulus @ +60° C. | 1.04 | 0.89 | 0.99 |
| MDR CURE CHARACTERISTICS (1.7 Hz., 3° arc, 60' @ 70° C.). | | | |
| MH (dN.m) | 45.3 | 45.6 | 56.7 |
| ML (dN.m) | 12.3 | 13.3 | 21.4 |
| ts 1 (min) | 0.48 | 0.48 | 0.42 |
| ts 2 (min) | 0.54 | 0.6 | 0.54 |
| t' 10 (min) | 0.65 | 0.69 | 0.59 |
| t' 50 (min) | 2.59 | 2.4 | 1.78 |
| t' 90 (min) | 7.63 | 6.66 | 5.72 |
| t' 95 (min) | 9.48 | 8.28 | 7.42 |

What is claimed is:

1. A filled, cured elastomer composition in the form of a tread for a vehicle tire, wherein the filled cured elastomer is prepared by admixing a halobutyl elastomer, particles of a filler, an aminoalcohol, and curing the resulting filled halobutyl elastomer.

2. A filled, cured elastomer composition in the form of an innerliner for a vehicle tire, wherein the filled cured elastomer is prepared by admixing a halobutyl elastomer, particles of a filler, an amino-alcohol, and curing the resulting filled halobutyl elastomer.

* * * * *